(No Model.)

E. E. REEDY.
EGG BEATER.

No. 585,703. Patented July 6, 1897.

*Fig 3.* *Fig 4.*

WITNESSES
C. N. Walker.
Henry H. Byrne.

INVENTOR
Edward E. Reedy,
by John Wedderburn
Attorney

THE NORRIS PETERS CO., PHOTO-LITHO., WASHINGTON, D. C.

UNITED STATES PATENT OFFICE.

EDWARD E. REEDY, OF PORT CARBON, PENNSYLVANIA.

EGG-BEATER.

SPECIFICATION forming part of Letters Patent No. 585,703, dated July 6, 1897.

Application filed December 8, 1896. Serial No. 614,917. (No model.)

*To all whom it may concern:*

Be it known that I, EDWARD E. REEDY, a citizen of the United States, residing at Port Carbon, in the county of Schuylkill and State of Pennsylvania, have invented certain new and useful Improvements in Egg-Beaters; and I do hereby declare the following to be a full, clear, and exact description of the invention, such as will enable others skilled in the art to which it appertains to make and use the same.

My invention relates to certain new and useful improvements in kitchen utensils; and its object is to provide a novel form of utensil adapted for use as an egg-beater or as a noodle-maker.

To this end my invention consists in certain novel constructions, combinations, and arrangements of parts, as will be hereinafter described, and set forth in the appended claim.

Figure 1:
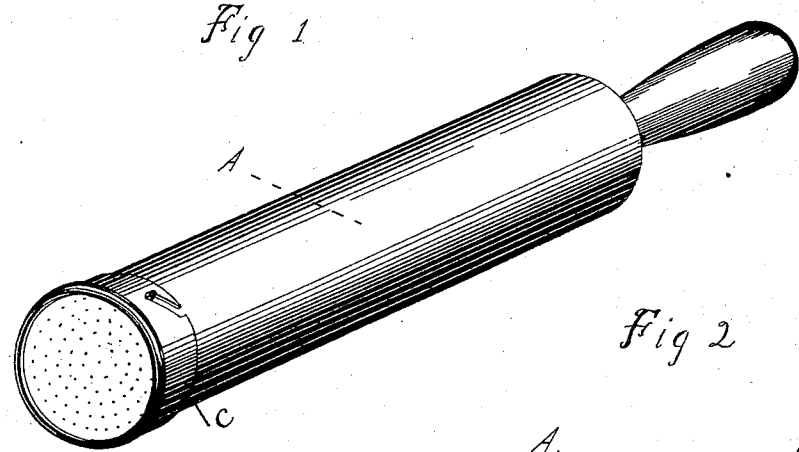
Figure 2:
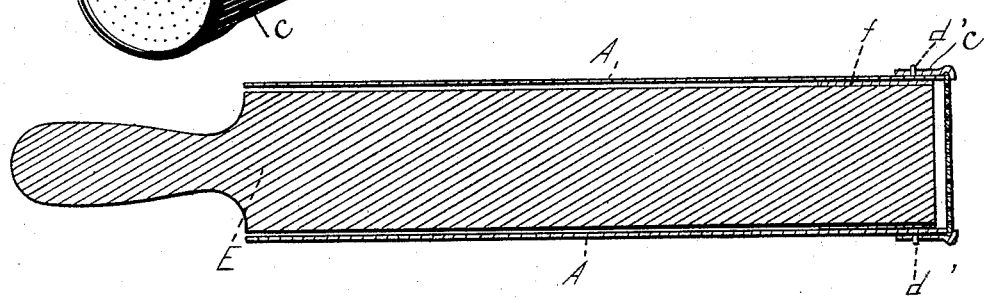
Figure 2:
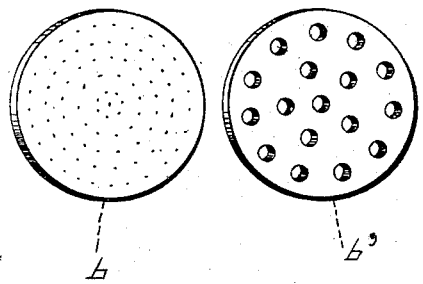
Figure 2:
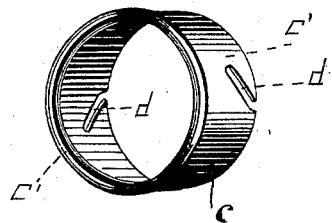

In the accompanying drawings, illustrating the invention, Figure 1 is an elevated view of the improved utensil. Fig. 2 is a sectional view of the same. Fig. 3 shows two forms of a perforated disk, one employed for egg-beating and the other adapted for noodle-making; and Fig. 4, a detail perspective view of the ring-clamp.

Referring to the drawings, the letter A represents a barrel or cylinder in which the broken eggs or noodle-dough is placed. This cylinder may be of wood or metal. At the lower end of the cylinder is a removable perforated disk. I have shown two forms of disks which are to be employed—one, like $b$ in Fig. 3, containing minute perforations and adapted for egg-beating, and the other, $b'$, same figure, containing larger perforations and adapted for noodle-making, as hereinafter described. A confining-cap or clamping-ring has an annular body portion $c$, which fits around the lower end of the cylinder and is provided with an inturned flange $c'$, which clamps the disk $b$ or $b'$ against the cylinder end. The clamping-ring may be held in position on the cylinder by any suitable fastening means. In the present instance it has at two opposite sides an angular slot $d$, adapted to engage with stop-pins $d'$ on the cylinder. This fastening permits of the clamping-ring being quickly and easily removed in order to change one form of disk-plate for another.

A plunger E fits within the cylinder and is provided at its upper end with a handle. This plunger is preferably constructed of wood and may have a metal ferrule $f$ around its lower end to serve as packing.

The operation is as follows: In beating eggs the minutely-perforated disk $b$ is employed and the broken eggs may be placed within the cylinder or in a suitable dish. The plunger E is now worked back and forth quickly within the cylinder, the result being to expel the eggs through the perforated disk and draw them back again in quick succession, whereby said eggs are thoroughly broken up or beaten and at the same time are incorporated with air.

If it is desired to make noodles, the perforated disk $b'$ is substituted for disk $b$ and the cylinder is filled with dough or batter. The utensil is then held over a kettle of boiling water and the plunger pressed down to force the dough through the perforated disk, the dough being thereby formed into noodle-strips, which drop into the boiling water.

My utensil provides an efficient kitchen utensil for quickly and easily beating eggs and making noodles, and as the construction is simple the device may be readily cleaned.

Having thus described my invention, what I claim as new, and desire to secure by Letters Patent, is—

An egg-beater and noodle-maker, comprising a cylinder provided with laterally-projecting locking-pins adjacent one end thereof, a plunger in said cylinder provided at its lower end with a ferrule, a removable perforated disk, and a fastening device provided with a vertical body portion having angularly-disposed slots adapted to engage said locking-pins, and an inturned flange to hold the said disk pressed against the cylinder end, and whereby the removal of one disk and substitution of another therefor may be readily and quickly accomplished, substantially as described.

In testimony whereof I have signed this specification in the presence of two subscribing witnesses.

EDWARD E. REEDY.

Witnesses:
GEO. E. MILLER,
WM. J. MCQUADE, Sr.